United States Patent
Kandamuthan et al.

(10) Patent No.: US 10,585,761 B2
(45) Date of Patent: Mar. 10, 2020

(54) METHODS AND SYSTEMS FOR ENERGY EFFICIENT DATA BACKUP

(71) Applicant: EMC IP Holding Company LLC, Hopkinton, MA (US)

(72) Inventors: Nirmala Kandamuthan, Bangalore (IN); Jaykumar G. Iyer, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 15/886,195

(22) Filed: Feb. 1, 2018

(65) Prior Publication Data
US 2019/0235966 A1   Aug. 1, 2019

(51) Int. Cl.
*G06F 15/16* (2006.01)
*G06F 11/14* (2006.01)
*G06F 1/3209* (2019.01)

(52) U.S. Cl.
CPC ........ *G06F 11/1461* (2013.01); *G06F 1/3209* (2013.01); *G06F 11/1464* (2013.01)

(58) Field of Classification Search
CPC .. G06F 1/3203; G06F 1/3209; G06F 11/1461; G06F 11/1464; G06F 11/1466
See application file for complete search history.

(56) References Cited

U.S. PATENT DOCUMENTS

| | | | | |
|---|---|---|---|---|
| 5,574,851 A | * | 11/1996 | Rathunde | G06F 3/0604 711/114 |
| 7,882,073 B1 | * | 2/2011 | Ojalvo | G06F 11/1458 707/640 |
| 8,060,476 B1 | * | 11/2011 | Afonso | G06F 11/1451 707/649 |
| 10,324,893 B1 | * | 6/2019 | Telang | G06F 16/137 |
| 2004/0268175 A1 | * | 12/2004 | Koch | H04L 67/1034 714/4.11 |
| 2005/0066022 A1 | * | 3/2005 | Liebenow | H04L 12/12 709/223 |
| 2008/0059275 A1 | * | 3/2008 | Keany | G06F 9/5027 718/102 |
| 2010/0121820 A1 | * | 5/2010 | Thapa | G06F 1/3209 707/641 |
| 2013/0263128 A1 | * | 10/2013 | Yamazaki | G06F 9/455 718/1 |
| 2013/0318313 A1 | * | 11/2013 | Clifford | G06F 11/1451 711/162 |
| 2014/0036660 A1 | * | 2/2014 | Ogaki | H04L 41/0833 370/219 |
| 2015/0230078 A1 | * | 8/2015 | Kandangath | H04L 67/1095 707/647 |
| 2016/0098192 A1 | * | 4/2016 | Ochi | G06F 3/061 711/111 |

(Continued)

*Primary Examiner* — Jonathan A Bui
(74) *Attorney, Agent, or Firm* — Womble Bond Dickinson (US) LLP (57) ABSTRACT

Methods and systems of awakening one or more clients for performance of data backup are disclosed. According to some embodiments, the method selects one or more clients for data backup. The method initiates a wake-up call for each of the selected clients. The method determines whether one or more of the selected clients are awake. In response to a determination that the one or more of the selected clients are awake, the method instructs the awakened selected clients to provide data for backup.

20 Claims, 5 Drawing Sheets

(56) References Cited

U.S. PATENT DOCUMENTS

2017/0364415 A1* 12/2017 Formato ............. G06F 11/1464
2018/0294983 A1* 10/2018 Mani ........................ H04L 12/12
2019/0037349 A1* 1/2019 Frusina ................ H04N 21/238

* cited by examiner

METHODS AND SYSTEMS FOR ENERGY EFFICIENT DATA BACKUP

FIELD OF THE INVENTION

Embodiments of the present invention relate generally to data storage systems. More particularly, embodiments of the invention relate to methods and systems for energy efficient data backup.

BACKGROUND

Backup storage systems are increasingly becoming more important as computer systems (e.g., desktops, laptops, or mobile devices, such as smartphones and tablets) continue to process and store large amounts of data. Generally, a backup storage system can include a storage device, for example a hard disk, a tape drive, a semiconductor memory, multiple storage devices such as a redundant array system (e.g., a redundant array of independent disks (RAID)), or any other appropriate storage device or system, together with a system that places data into the storage device and recovers the data from the storage device. To perform a backup, for example, a client system generally copies data from a local storage device (or shared storage system) to the backup storage system across a network. As such, one or more actual data files may be communicated over the network to the storage device of the backup storage system.

Unfortunately, conventional methods of backing up data on a client system require the client system to remain in a normal or high energy consumption mode (i.e., powered-up or power on state), thereby making the conventional backup methods energy inefficient.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one embodiment, in order to provide an energy efficient data backup process, a method of awakening one or more clients for performance of data backup selects one or more clients for data backup. The method initiates a wake-up call for each of the selected clients. The method determines whether one or more of the selected clients are awake. In response to a determination that the one or more of the selected clients are awake, the method instructs the awakened selected clients to provide data for backup.

In one aspect, for each of the selected clients, the method receives a request to awake the client from a low power consumption mode. In response to the request, the method wakes up the client from the low power consumption mode. The method sends an indication that the client is awake and ready to provide data for backup.

In one aspect, for each of the selected clients, the method determines whether a data backup operation is complete. In response to determining that the backup operation is complete, the method sends a backup complete signal indicating that the backup operation is complete. The method instructs the client to return to the low power consumption mode.

Figure 1:
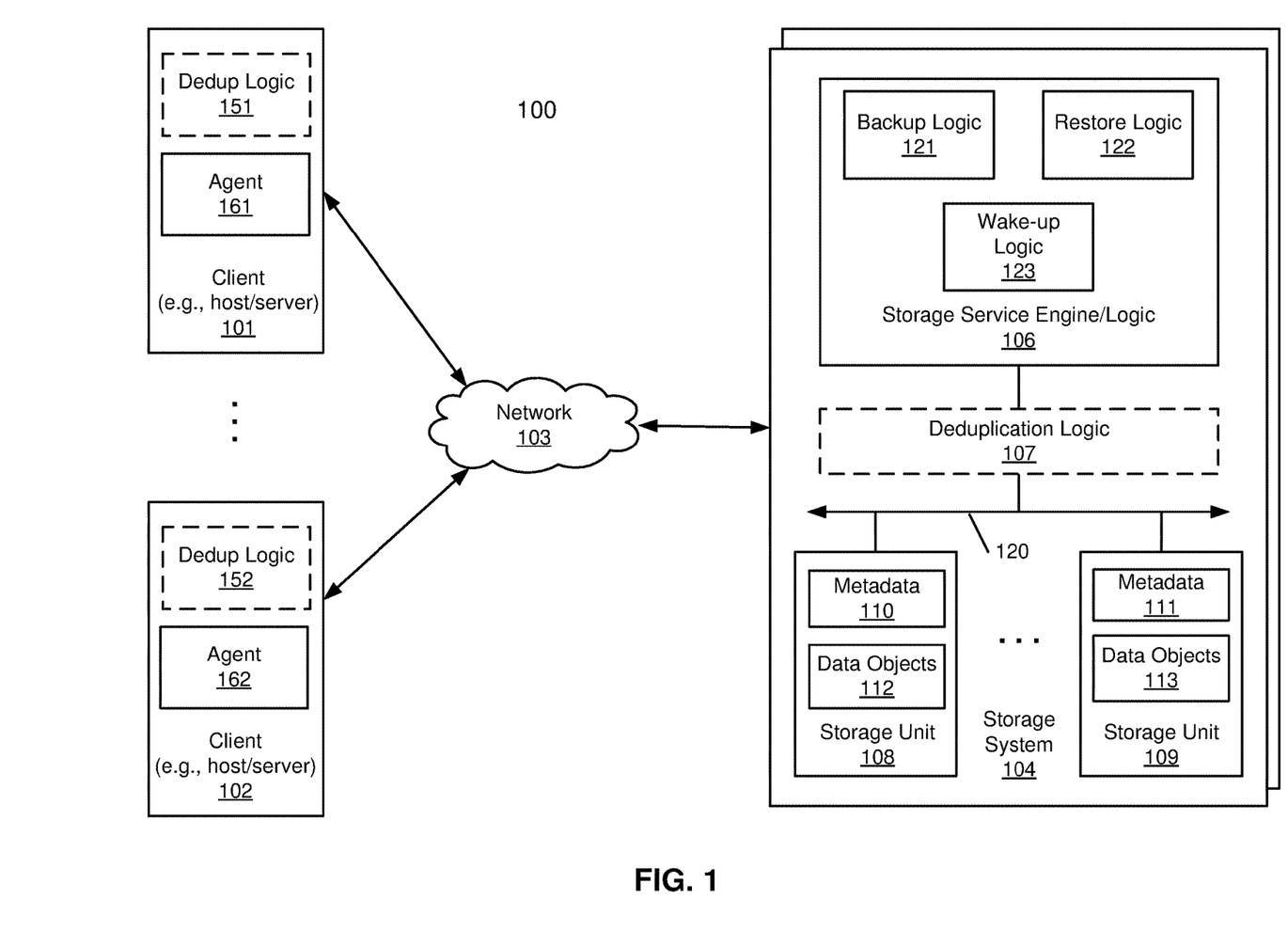
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol, Hadoop distributed file system (HDFS) protocol, and cloud services, such as Amazon Web Services (AWS), Amazon EC2 Container Service (ECS), and Microsoft Azure.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121, restore logic 122, and wake-up logic 123. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Wake-up logic 123 is configured to awaken clients 101 and 102 from a low power consumption mode (e.g., sleep, hibernation, hybrid sleep, or advanced configuration and power interface (ACPI) mode) prior to performing one or more backup operations. For example, in one embodiment, prior to invoking backup logic 121, wake-up logic 123 may be invoked to initiate a wake-up call for each of the clients 101-102 to bring clients 101-102 out of the low power consumption mode. In doing so, in one embodiment, wake-up logic 123 may send a wake-up signal that includes a wake-up message in accordance with a specific networking standard, such as Wake-on-LAN (WoL) (also referred to as wake on WAN, remote wake-up, power on by LAN, power up by LAN, resume by LAN, resume on LAN, or wake up on LAN), or Wake on Wireless LAN (WoWLAN). Alternatively, in one embodiment, wake-up logic 123 may communicate with agents 161-162, respectively installed on clients 101-102, to wake-up clients 101-102 from the low power consumption mode. For example, wake-up logic 123 may send an awake request to agents 161-162 requesting agents 161-162 to awaken clients 101-102. Once wake-up logic 123 determines that clients 101-102 are awake (or ready for data backup), wake-up logic 123 may instruct clients 101-102 to perform one or more scheduled backup operations. For example, wake-up logic 123 may send a backup request to agents 161-162, which may initiate clients 101-102 to provide data for data backup over network 103.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

As previously described, any of clients 101-102 may include an agent (e.g., agents 161-162). Agents 161-162 may monitor network 103 for probes from storage system 104 (e.g., wake-up logic 123). In one embodiment, each of the agents 161-162 may be a service or daemon that performs one or more specific tasks. For example, in response to the awake request received from wake-up logic 123, agents 161-162 may access the basic input output system (BIOS) of clients 101-102 to awaken clients 101-102 from a low power consumption mode, e.g., via the resume by alarm or wake-up on real-time clock (RTC) feature in the BIOS. Once clients 101-102 are awake, agents 161-162 may send an indication that clients 101-102 are awake or ready for backup to wake-up logic 123. In response to receiving a backup request from wake-up logic 123, agents 161-162 may initiate clients 101-102 to provide data to storage system 104 for backup. That is, agents 161-162 may execute a backup job on clients 101-102 to stream backup data over network 103. Once the backup job is complete, agents 161-162 may send a backup complete signal to wake-up logic 123 indicating that the backup operations are complete (e.g., all data have been transmitted) for clients 101-102.

Agents 161-162 may then instruct clients 101-102 to return to the low power consumption mode, e.g., via the BIOS of clients 101-102.

Figure 2:
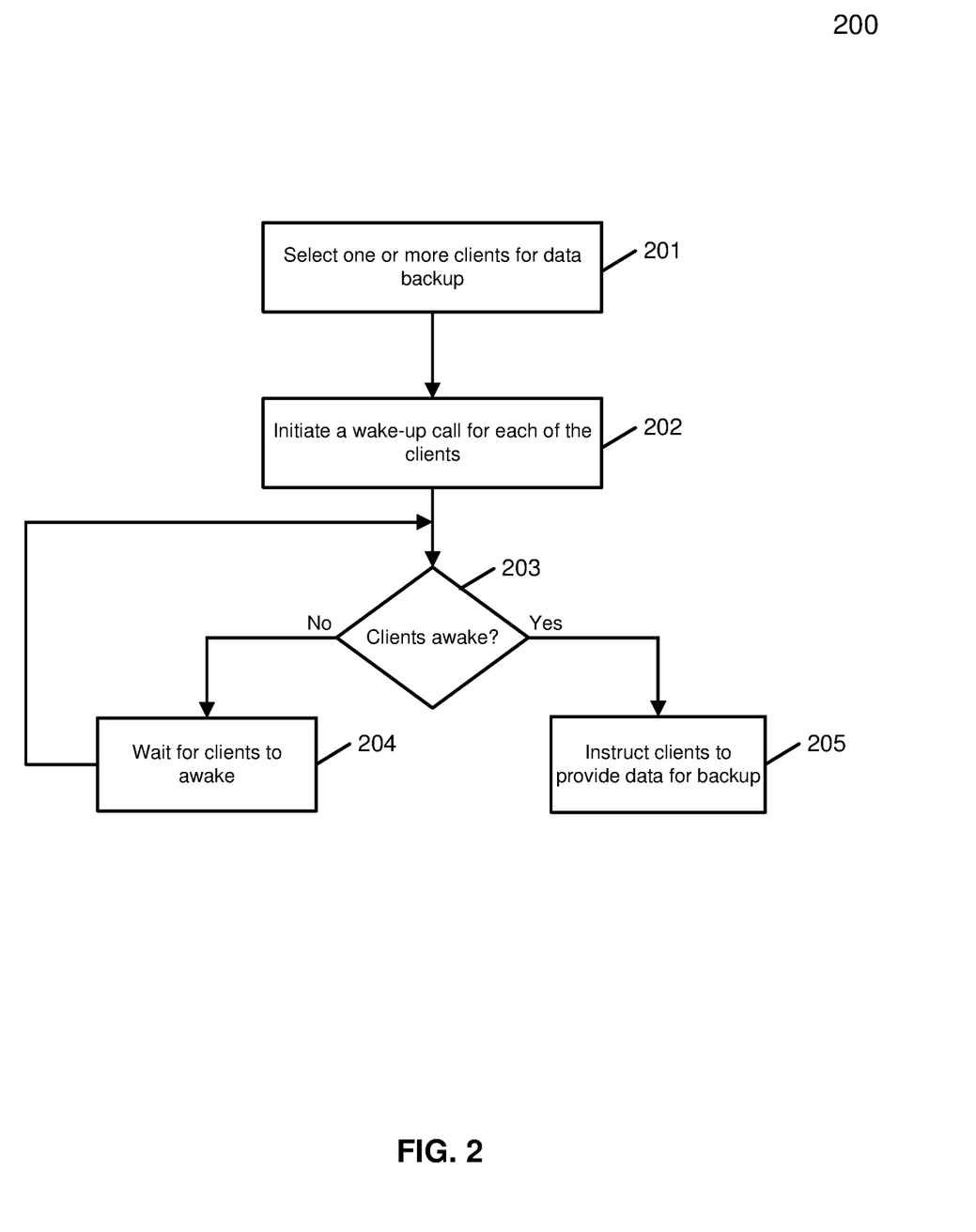
FIG. 2 is a flow diagram illustrating a process of awakening one or more clients for performance of one or more backup operations according to one embodiment of the invention.

FIG. 2 is a flow diagram illustrating a process of awakening one or more clients for performance of one or more backup operations according to one embodiment of the invention. Process 200 may be performed by processing logic that includes hardware (e.g. circuitry, dedicated logic, etc.), software (e.g., embodied on a non-transitory computer readable medium), or a combination thereof. For example, process 200 may be performed by wake-up logic 123 of FIG. 1.

Referring to FIG. 2, at block 201, the processing logic selects one or more clients (e.g., clients 101-102) for data backup. In one embodiment, depending on the bandwidth of a storage system (e.g., storage system 104), the clients may be divided into multiple groups for selection. For instance, if there is insufficient bandwidth to handle all clients for data backup, the clients may be divided into different groups for performance of data backup at different backup schedules. At block 202, the processing logic initiates a wake-up call for each of the selected clients. For example, in one embodiment an awake (or wake-up) request may be sent to each of the clients to awake the clients from a low power consumption mode (e.g., sleep, hibernation, hybrid sleep, or ACPI mode). In one embodiment, the awake request may be formed in accordance with a networking standard or protocol, such as WoL or WoWLAN. Alternatively, in one embodiment the awake request may communicate with an agent (e.g., agents 161-162) installed on each of the clients so as to effectively cause the agent to bring the clients out of the low power consumption mode (e.g., via the BIOS of the clients as previous described). At block 203, the processing logic determines whether the clients are awake and ready for data backup. As an example, if a signal indicating that the clients are awake or ready for data backup is received, for example from the agent installed on each of the clients, then it may be determined that the clients are awake. Otherwise, it may be determined that the clients are not awake. Accordingly, if all (or at least one) of the clients are awake the processing logic proceeds to block 205. Otherwise, the processing logic proceeds to block 204. At block 204, the processing logic awaits the clients to be awakened. For instance, the processing logic may wait for a predetermined time period and return to block 203 to determine whether all or at least one the clients are awake. If the clients continue to operate in the low power consumption mode (i.e., not awake), the processing logic may time out and terminate the process, or return to block 202 to reinitiate the wake-up call. At block 205, the processing logic instructs the awakened clients to provide data for backup. In doing so, a backup request may be sent to each of the clients so as to cause the clients to transmit data over a network (e.g., network 103) for backup. In one embodiment, the backup request may include a data size of the backup data to be received (i.e., the amount of backup data to be transmitted by a client). In one embodiment, the data size may be used to compute a backup window (e.g., a time period in which a backup can be performed) such that the backup window is opened just long enough to receive the amount of data specified by the data size. In one embodiment, the backup window may be recalculated if the data size is insufficient. For example, in response to receiving a backup request, a client may determined the data size is less than (or greater than) the amount of data to be backed up. Accordingly, the client may send a response with the information of the actual amount of data (or data size) to be backed up. Based on the response, the backup window may be recalculated to accommodate the actual data size of the backup data. In one embodiment, a backup window may be assigned to each of the selected clients. Alternatively, in one embodiment a common backup window may be assigned to the group of selected clients. That is, the common backup window may be opened long enough in order to receive backup data from the group of selected clients.

Figure 3:
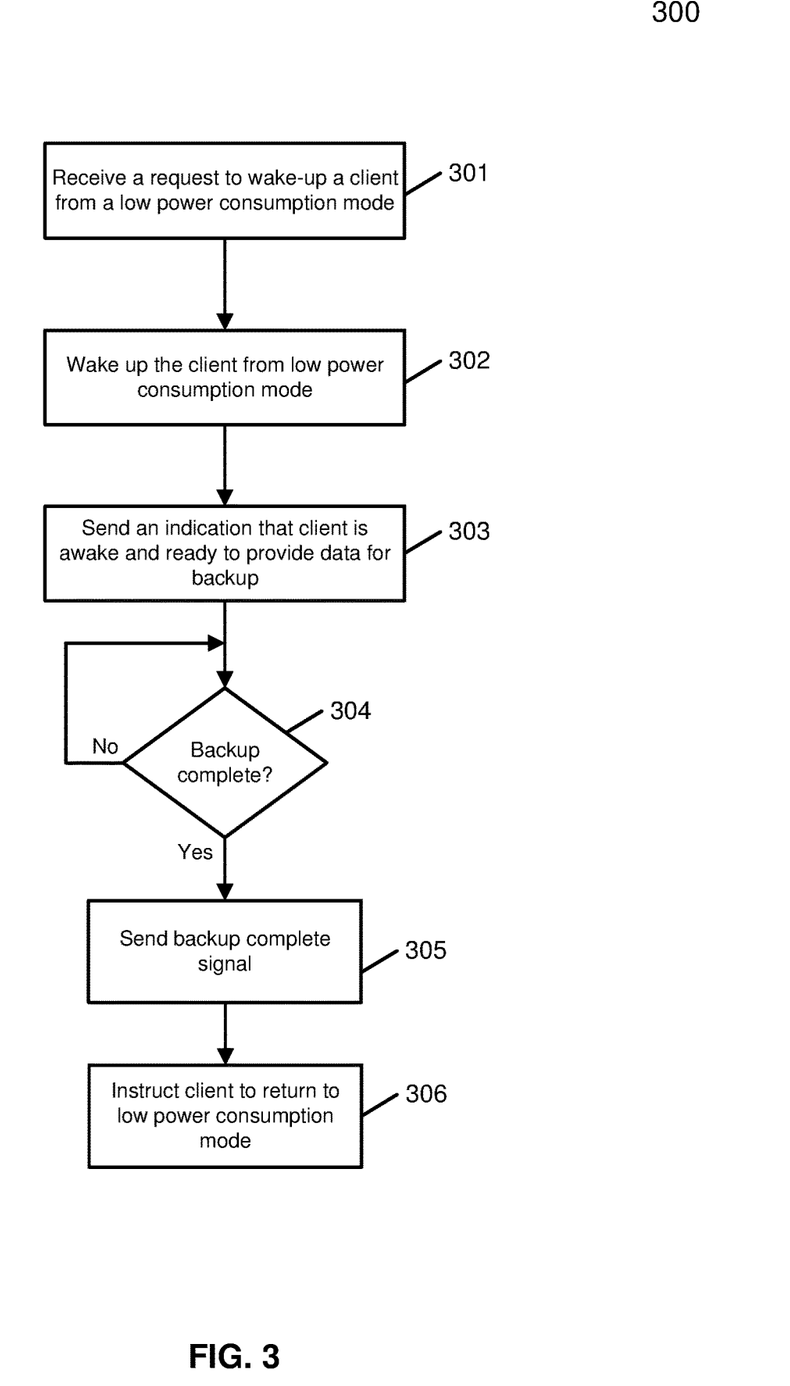
FIG. 3 is a flow diagram illustrating another process of awakening one or more clients for performance of one or more backup operations according to one embodiment of the invention.

FIG. 3 is a flow diagram illustrating another process of awakening one or more clients for performance of one or more backup operations according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by each of the agents 161-162 of FIG. 1.

Referring to FIG. 3, at block 301, the processing logic receives a request to wake-up a client (e.g., any of clients 101-102) from a low power consumption mode. The request may be formed in accordance with a networking standard or protocol, such as WoL or WoWLAN. At block 302, in response to the request, the processing logic awakes the client from the low power consumption mode. For example, if the request is a WoL or WoWLAN request, then the client may automatically be awakened in accordance with the WoL or WoWLAN protocol. Otherwise, as previously described, the processing logic may access the BIOS of the client to bring the client out of the low power consumption mode. Once the client is awake, at block 303, the processing logic sends an indication that the client is awake and ready to provide data for backup. At block 304, the processing logic determines whether the backup operation is complete. For example, it may be determined that the backup operation is complete if the client has transmitted all of the backup data, for example to storage system 104. Otherwise, it may be determined that backup is incomplete. Accordingly, if backup is complete, the processing logic proceeds to block 305. Otherwise, the processing logic returns to block 304. At block 305, the processing logic sends a backup complete signal, for example to storage system 104, indicating that backup is complete. At block 306, the processing logic instructs the client to return to the low power consumption mode. In doing so, in one embodiment, the processing logic may access the BIOS and/or the operating system running on the client to place the client in a sleep, hibernation, hybrid sleep, or ACPI mode.

Figure 4:
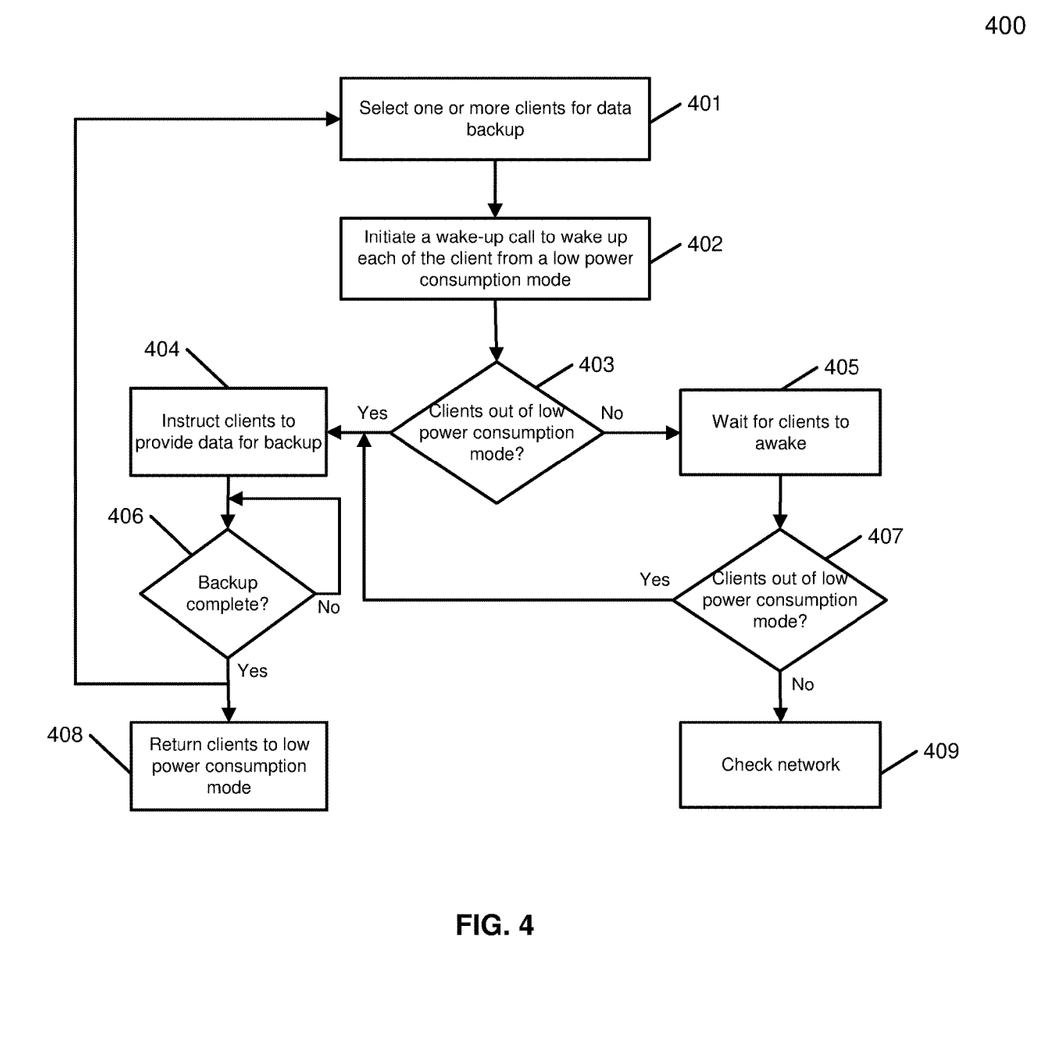
FIG. 4 is a flow diagram illustrating yet another process of awakening one or more clients for performance of one or more backup operations according to one embodiment of the invention.

FIG. 4 is a flow diagram illustrating yet another process of awakening one or more clients for performance of one or more backup operations according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by wake-up logic 123 and/or any of agents 161-162 of FIG. 1.

Referring to FIG. 4, at block 401, the processing logic selects one or more clients for data backup. As previously described, the clients may be divided into groups depending on the available bandwidth of a storage system (e.g., storage system 104). At block 402, the processing logic initiates a wake-up call to wake up each of the clients from a low power consumption mode. At block 403, the processing logic determines whether all (or at least one) of the selected clients are out of the low power consumption mode. If so, the processing logic proceeds to block 404. Otherwise the processing logic proceeds to block 405. At block 404, the processing logic instructs the awakened clients to provide data for backup. As previously described, a backup request may be sent to each of the selected clients to instruct the clients to transmit data over a network (e.g., network 103) for backup. At block 406, the processing logic determines whether backup is complete. In one embodiment, it may be determined that backup is complete if a backup complete signal is received, for example from each of the agents 161-162. If backup is complete, the processing logic proceeds to block 408. Otherwise the processing logic returns to block 406. At block 408, the clients are returned to the low power consumption mode, for example by agents 161-162. Referring back to block 405, the processing logic waits for the clients to awake. For example, the processing logic may wait for a predetermined time period before proceeding to block 407. At block 407, the processing logic again determines whether all (or at least one) of the selected clients are out of the low power consumption mode (i.e., awake). If so, the processing logic proceeds to block 404 (as previously described). Otherwise, processing logic proceeds to block 409 to check the network (e.g., network 103). In checking the network, the processing logic may perform diagnostic tests on the network to troubleshoot the network. Such diagnostic tests may determine whether reliable communications are established among, for example storage system 104 and clients 101-102.

Note that some or all of the components as shown and described above (e.g., agents 161-162 and wake-up logic 123 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
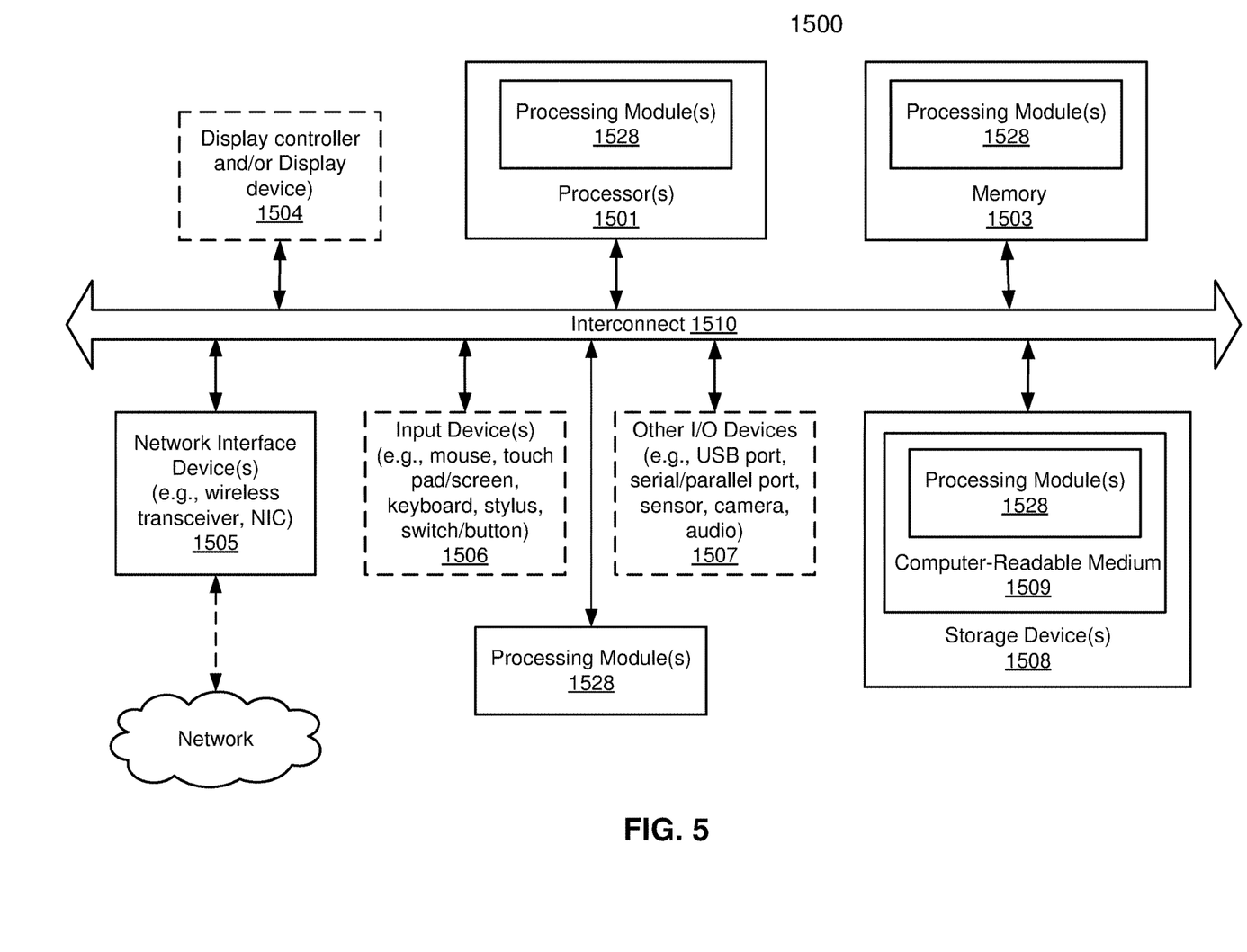
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, storage service logic 106 and deduplication logic 107, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of awakening one or more clients for performance of data backup, the method comprising:
   selecting one or more clients for data backup;
   initiating a wake-up call for each of the selected clients;
   determining whether one or more of the selected clients are awake;
   in response to determining that the one or more of the selected clients are awake, sending a backup request to one or more selected clients instructing the awakened selected clients to provide data for backup, the backup request including a data size of the data for backup to be received from the one or more selected clients; and
   computing a backup window to receive the data for backup based on the data size.

2. The method of claim 1, further comprising:
   for each of the selected clients,
      receiving a request to awake the client from a low power consumption mode,
      in response to the request, waking up the client from the low power consumption mode, and
      sending an indication that the client is awake and ready to provide data for backup.

3. The method of claim 2, further comprising:
   for each of the selected clients,
      determining whether a data backup operation is complete,
      in response to determining that the backup operation is complete, sending a backup complete signal indicating that the backup operation is complete, and
      instructing the client to return to the low power consumption mode.

4. The method of claim 3, wherein the low power consumption mode is one of: a sleep mode, a hibernation mode, a hybrid sleep mode, or an advanced configuration and power interface (ACPI) mode.

5. The method of claim 1, wherein selecting one or more clients for data backup comprises dividing the clients into groups for performance of data backup at different backup schedules.

6. The method of claim 2, wherein determining whether one or more of the selected clients are awake comprises determining that the one or more of the selected clients are out of the low power consumption mode.

7. The method of claim 2, wherein the request is in accordance with a Wake-on-LAN (WoL) or Wake on Wireless LAN (WoWLAN) protocol.

8. A non-transitory machine-readable medium having instructions stored therein, which when executed by a processor, cause the processor to perform operations, the operations comprising:
   selecting one or more clients for data backup;
   initiating a wake-up call for each of the selected clients;
   determining whether one or more of the selected clients are awake;
   in response to determining that the one or more of the selected clients are awake, sending a backup request to one or more selected clients instructing the awakened selected clients to provide data for backup, the backup request including a data size of the data for backup to be received from the one or more selected clients; and
   computing a backup window to receive the data for backup based on the data size.

9. The non-transitory machine-readable medium of claim 8, wherein the operations further comprise:
   for each of the selected clients,
      receiving a request to awake the client from a low power consumption mode,
      in response to the request, waking up the client from the low power consumption mode, and
      sending an indication that the client is awake and ready to provide data for backup.

10. The non-transitory machine-readable medium of claim 9, wherein the operations further comprise:
    for each of the selected clients,
       determining whether a data backup operation is complete,
       in response to determining that the backup operation is complete, sending a backup complete signal indicating that the backup operation is complete, and
       instructing the client to return to the low power consumption mode.

11. The non-transitory machine-readable medium of claim 10, wherein the low power consumption mode is one of: a sleep mode, a hibernation mode, a hybrid sleep mode, or an advanced configuration and power interface (ACPI) mode.

12. The non-transitory machine-readable medium of claim 8, wherein selecting one or more clients for data backup comprises dividing the clients into groups for performance of data backup at different backup schedules.

13. The non-transitory machine-readable medium of claim 9, wherein determining whether one or more of the selected clients are awake comprises determining that the one or more of the selected clients are out of the low power consumption mode.

14. The non-transitory machine-readable medium of claim 9, wherein the request is in accordance with a Wake-on-LAN (WoL) or Wake on Wireless LAN (WoWLAN) protocol.

15. A data processing system, comprising:
    a processor; and a memory coupled to the processor to store instructions, which when executed by the processor, cause the processor to perform operations, the operations comprising:
  selecting one or more clients for data backup;
  initiating a wake-up call for each of the selected clients;
  determining whether one or more of the selected clients are awake;
  in response to determining that the one or more of the selected clients are awake, sending a backup request to one or more selected clients instructing the awakened selected clients to provide data for backup, the backup request including a data size of the data for backup to be received from the one or more selected clients; and
  computing a backup window to receive the data for backup based on the data size.

16. The data processing system of claim 15, wherein the operations further comprise:
  for each of the selected clients,
    receiving a request to awake the client from a low power consumption mode,
    in response to the request, waking up the client from the low power consumption mode, and
    sending an indication that the client is awake and ready to provide data for backup.

17. The data processing system of claim 16, wherein the operations further comprise:
  for each of the selected clients,
    determining whether a data backup operation is complete,
    in response to determining that the backup operation is complete, sending a backup complete signal indicating that the backup operation is complete, and
    instructing the client to return to the low power consumption mode.

18. The data processing system of claim 17, wherein the low power consumption mode is one of: a sleep mode, a hibernation mode, a hybrid sleep mode, or an advanced configuration and power interface (ACPI) mode.

19. The data processing system of claim 15, wherein selecting one or more clients for data backup comprises dividing the clients into groups for performance of data backup at different backup schedules.

20. The data processing system of claim 16, wherein determining whether one or more of the selected clients are awake comprises determining that the one or more of the selected clients are out of the low power consumption mode.

* * * * *